Nov. 22, 1927. 1,649,907

R. F. MAYER

COMBINATION OF GLASS AND METAL BODIES

Filed April 26, 1921

Inventor:
Robert F. Mayer
by
Rosenbaum Stockbridge & Borst
Attorneys

Patented Nov. 22, 1927.

1,649,907

UNITED STATES PATENT OFFICE.

ROBERT FRANZ MAYER, OF VIENNA, AUSTRIA, ASSIGNOR TO THE LIMITED COMPANY W. C. HERÄUS GESELLSCHAFT MIT BESCHRÄNKTER HAFTUNG, OF HANAU-ON-THE-MAIN, GERMANY.

COMBINATION OF GLASS AND METAL BODIES.

Application filed April 26, 1921, Serial No. 464,757, and in Austria October 10, 1919.

Platinum has been hitherto used exclusively for the gas tight fixing of the electrodes in vacuum tubes, specially Roentgen tubes in the glass. It is not possible to simply substitute other metals for the platinum as is generally done at present in the manufacturing of incandescent lamps, as the question is not to merely melt in wires but sheet metal pots or rings, that is to say large constructional parts.

In order to make this invention clearly understood, I shall proceed to describe the same with reference to the accompanying drawing, wherein:—

Figure 1:
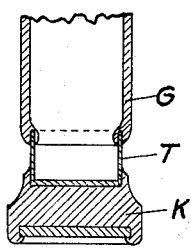
Fig. 1 illustrates the usual method of the melting in of electrodes into glass tubes.
Figure 2:
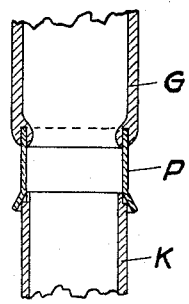
Fig. 2 shows an usual tubular electrode used instead of the pot-shaped electrode.

In Fig. 1 which illustrates the actual method of melting in electrodes in glass tubes, K designates the copper electrode which is soldered upon the pot T of platinum which itself is melted into the glass edge G. Figure 2 shows a tubular electrode used instead of the pot-shaped electrode.

According to this invention the piece to be melted in is made from two metals or metal alloys, a core metal possessing a coefficient of expansion which comes sufficiently near that of the glass, such as for example the iron-nickel alloys known from the incandescent lamp industry, and a thin coating of such a metal which, owing to its special property, can, by melting, be combined solidly and securely with glass, such as platinum or copper for example, said coating being put on according to any known process.

Figure 3:
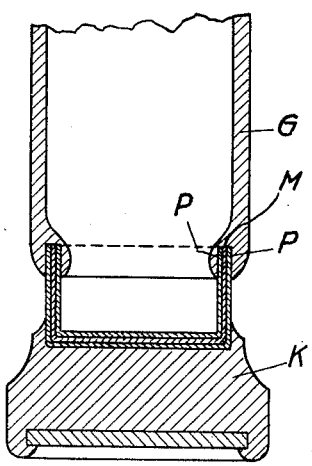
Figs. 3 and 4 show the form of execution of the invention according to which the metal skin coating covers the entire pot or ring respectively.
Figure 4:
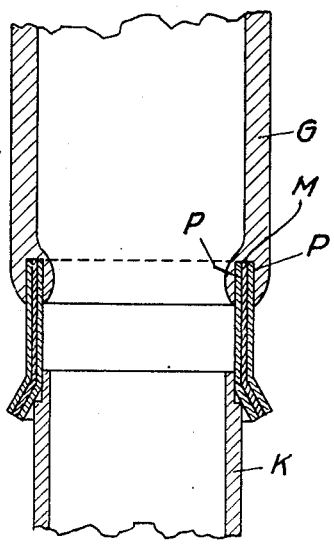

It is not necessary that the coating metal covers entirely the pot or ring, only those parts having to be covered with platinum which are in direct contact with the glass. Besides the platinum copper has proved to be a good coating metal. Figures 3 and 4 illustrate the form of execution of the invention according to which the metal skin coating covers the pot (Fig. 3) or ring (Fig. 4) entirely. P designates the coating metal layer, M the inner metal core having a coefficient of expansion differing little from that of the glass. With these pots or rings when being manufactured in large quantities by being pressed from sheet metal or by being cut off from tubes the glass could come in contact with the inner metal core at the edges of the pot or of the ring, if these edges were not, according to this invention, flanged as shown by Fig. 5 or as shown by Fig. 6, bent down, soldered on or welded on.

Owing to this special construction only those parts of the pot or ring which come in contact with the glass need be covered with the coating metal.

Figure 5:
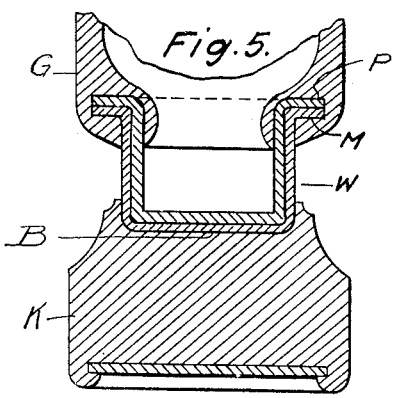
Figs. 5 and 6 show special constructions of the pot or ring.
Figure 6:
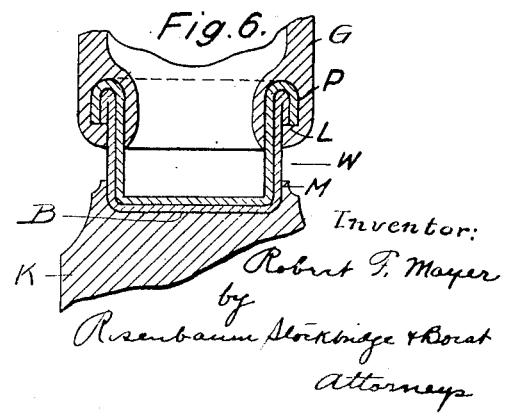

In Figs. 5 and 6 B designates the bottom of the pot, shown by way of example only, W designates the side wall which consists of the metal M and of the coating metal layer P applied only upon the inner surface.

While I have specifically mentioned platinum and copper as good coating metals, it will be understood that is for the purpose of explanation of the principle of the invention or discovery only and that various other materials or alloys which adhere well to glass may be used and are considered as equivalents of the metals specifically cited. It is believed that the adherence of the coating metal to the glass is due to the solubility of such metals or their oxides in the glass.

Now what I claim and desire to secure by Letters Patent is the following:—

1. In glass bodies with melted-in metal piece, the combination of a tubular glass body and a cup-shaped metal closure piece having its open end melted into and closing the cavity of the glass body and with its inner end terminating within the glass body, said metal piece comprising a body part with a coefficient of expansion approximately near that of the glass, and a coating of a material to which the glass adheres well, on the body part extending over the surfaces engaged by the glass body and across the interior of the closure whereby external air, or air trapped between the coating and the body part of the metal closure piece, cannot enter the cavity in the glass body through the line of division between the coating and the body part of the closure piece.

2. In glass bodies with melted-in metal piece, the combination of a tubular glass body, and a metal closure piece with a tubular flange, said flange having its open end melted into and closing the cavity in the glass body, said closure piece comprising a body of a material having a coefficient of expansion approximately near that of the glass, and a coating of a material to which the glass adheres well extending over the inner surface of the closure piece including at least a portion of the inner surface thereof engaged by the glass, whereby external air cannot pass between the coating and body of the closure piece into the cavity of the glass body or air trapped between the coating and body of the closure piece cannot enter the cavity of the glass body.

In testimony, that I claim the foregoing as my invention, I have signed my name.

ROBERT FRANZ MAYER.